United States Patent
Elings (10) Patent No.: US 9,530,187 B2
(45) Date of Patent: Dec. 27, 2016

(54) CONTROLLING ELEMENT LAYOUT ON A DISPLAY

(71) Applicant: Apple Inc., Cupertino, CA (US)

(72) Inventor: Michel Elings, Bussum (NL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/303,583

(22) Filed: Jun. 12, 2014

(65) Prior Publication Data

US 2014/0368547 A1 Dec. 18, 2014

Related U.S. Application Data

(60) Provisional application No. 61/834,684, filed on Jun. 13, 2013.

(51) Int. Cl.
| | | |
|---|---|---|
| *G06T 3/60* | (2006.01) | |
| *G06F 3/0488* | (2013.01) | |
| *G06F 3/0346* | (2013.01) | |
| *G06F 3/0487* | (2013.01) | |
| G06F 17/21 | (2006.01) | |
| G06F 17/22 | (2006.01) | |
| G09G 5/14 | (2006.01) | |

(52) U.S. Cl.
CPC ............... *G06T 3/60* (2013.01); *G06F 3/0346* (2013.01); *G06F 3/0487* (2013.01); *G06F 3/04886* (2013.01); *G06F 17/211* (2013.01); *G06F 17/212* (2013.01); *G06F 17/2294* (2013.01); *G09G 5/14* (2013.01); *G09G 2340/0492* (2013.01)

(58) Field of Classification Search
CPC ..... G09G 2340/0492; G09G 5/14; G06T 3/60; G06F 3/0346; G06F 3/0487; G06F 3/04886; G06F 17/212; G06F 17/211; G06F 17/2294

USPC .......................... 345/659, 649; 715/243–253
See application file for complete search history.

(56) References Cited

U.S. PATENT DOCUMENTS

| | | | |
|---|---|---|---|
| 2004/0179026 A1* | 9/2004 | Rix ............................... | 345/660 |
| 2006/0200752 A1* | 9/2006 | Sellers et al. .................. | 715/503 |
| 2008/0048993 A1* | 2/2008 | Yano ............................. | 345/173 |
| 2011/0084913 A1* | 4/2011 | Wirtanen ....................... | 345/173 |
| 2012/0154386 A1* | 6/2012 | Nagara et al. ................. | 345/419 |
| 2012/0201479 A1* | 8/2012 | Zhang et al. .................. | 382/284 |
| 2013/0021377 A1* | 1/2013 | Doll .............................. | 345/649 |
| 2013/0275864 A1* | 10/2013 | William ........................ | 715/244 |
| 2014/0152575 A1* | 6/2014 | Joe et al. ....................... | 345/169 |
| 2014/0258849 A1* | 9/2014 | Chung .................. | G06F 17/212 715/243 |
| 2015/0050633 A1* | 2/2015 | Christmas et al. ........... | 434/322 |

* cited by examiner

*Primary Examiner* — Jin-Cheng Wang
(74) *Attorney, Agent, or Firm* — Adeli LLP (57) ABSTRACT

Some embodiments provide a method for displaying an electronic publication. The method receives a selection of a cover page displayed for an electronic publication. The method animates an opening of the cover page to a first content page of the electronic publication that appears as an opposite side of the cover page during the opening animation. While displaying a second content page of the electronic publication, the method receives input to close the electronic publication. The method animates a closing of the electronic publication in order to display the cover page. The second content page appears as an opposite side of the cover page during the closing animation.

20 Claims, 11 Drawing Sheets

CONTROLLING ELEMENT LAYOUT ON A DISPLAY

CLAIM OF BENEFIT TO PRIOR APPLICATIONS

This application claims the benefit of U.S. Provisional Patent Application 61/834,684, filed Jun. 13, 2013. U.S. Application 61/834,684 is incorporated herein by reference.

FIELD OF INVENTION

This disclosure relates to changing the displayed content in an electronic user interface.

BACKGROUND

With the proliferation of portable electronic devices today, users are managing and handling a lot of their daily tasks with their electronic devices. For example, users read news, communicate with others (e.g. via electronic mail), take photographs, play games, and watch movies using their portable electronic devices. While there are many different types and brands of electronic devices, these devices share some things in common, one of which is a rectangular display capable of accommodating the standard aspect ratios.

Some of the portable devices include a gyroscope and/or an accelerometer such that the screen content being displayed can be adjusted to the orientation that is desired by the user. Given the rectangular shape of the display, the orientations usually include a portrait mode in which the vertical dimension is greater than the horizontal dimension, or a landscape mode in which the horizontal dimension is greater than the vertical dimension. The incorporation of a gyroscope in the device allows the screen content to adjust automatically between portrait and landscape mode without explicit instruction from the user, simply based on which way the device is being held.

While the automatic adjustment of the screen content according to the device orientation is convenient for users in many situations, it can pose a challenge to content creators. In a traditional medium such as paper, where content was printed with the paper orientation fixed, the content creator could lay out the elements of the page in a way that works best for a particular orientation (e.g., portrait) without having to worry about what the page would look like if it were presented in a different orientation (e.g., landscape). For those creating content to be displayed on an electronic device, they have to make sure that the content that is displayed maintains the general spirit/objective of the creator in either orientation.

BRIEF SUMMARY

Some embodiments provide a method for generating a layout for display on a display device that has first and second orientations (e.g., landscape and portrait orientations). In some embodiments, the layout includes several layout elements (e.g., icons, selectable items, etc.) that are arranged in a default order (e.g., as displayed from left to right and top to bottom). If at least one of the layout elements has a specified display limitation, the method may override the default order in order to satisfy the display limitation, such that the layout elements are presented in different orders in the first and second orientations.

The display limitations, in some embodiments, specify a particular positional limitation for an element (e.g., top right corner of the display, centered, etc.). In addition, the display limitations may specify a size for the element in the different orientations. Some embodiments divide the display into a set of sections, with each element assigned by default to one section. However, the size limitations may specify that a layout element occupy a particular number of sections in one or the other orientation (e.g., 2×1 in portrait orientation and 1×1 in landscape orientation). Some layout elements may have both positional and size limitations specified.

In generating the display for a particular orientation, some embodiments arrange the layout elements in the default order, assigning each layout element to a section of the display. These sections may be different sizes or shapes (e.g., have different aspect ratios) between different orientations of the display device, and the number of sections may be different for the different orientations. As the method assigns the elements to location, the default order may be overridden for an element that is fixed in a particular location (e.g., a particular corner of the display). Similarly, a size limitation may result in the modification of the otherwise default display.

In different embodiments, the method may be performed either on the back-end or front-end. In some embodiments, a server generates the layout for each of the different orientations and provides the generated layout to one or more requesting devices. In other embodiments, however, the display device on which the layout is displayed generates the layout depending on the orientation of the device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for generating a layout for display on a display device that has first and second orientations (e.g., landscape and portrait orientations). In some embodiments, the layout includes several layout elements (e.g., icons, selectable items, etc.) that are arranged in a default order (e.g., as displayed from left to right and top to bottom). If at least one of the layout elements has a specified display limitation, the method may override the default order in order to satisfy the display limitation, such that the layout elements are presented in different orders in the first and second orientations.

In some embodiments, a layout element, as used herein, may be any element that is displayed, an activation of which causes the display of new content (e.g., a website, video, text and/or images, an electronic publication, a software application, etc.). In some embodiments, the elements are cover pages representing electronic publications (e.g., digital magazines) with content that can be accessed by activating the cover page. The elements may be independent from one another, although some may be linked to others. In some cases within this disclosure, the elements may also be referred to as tiles, though the elements are not limited to such tiles.

The display limitations, in some embodiments, specify a particular positional limitation for an element (e.g., top right corner of the display, centered, etc.). In addition, the display limitations may specify a size for the element in the different orientations. Some embodiments divide the display into a set of sections, with each element assigned by default to one section. However, the size limitations may specify that a layout element occupy a particular number of sections in one or the other orientation (e.g., 2×1 in portrait orientation and 1×1 in landscape orientation). Some layout elements may have both positional and size limitations specified.

In generating the display for a particular orientation, some embodiments arrange the layout elements in the default order, assigning each layout element to a section of the display. These sections may be different sizes or shapes (e.g., have different aspect ratios) between different orientations of the display device, and the number of sections may be different for the different orientations. As the method assigns the elements to location, the default order may be overridden for an element that is fixed in a particular location (e.g., a particular corner of the display). Similarly, a size limitation may result in the modification of the otherwise default display.

In different embodiments, the method may be performed either on the back-end or front-end. In some embodiments, a server generates the layout for each of the different orientations and provides the generated layout to one or more requesting devices. In other embodiments, however, the display device on which the layout is displayed generates the layout depending on the orientation of the device.

In one aspect, the inventive concept disclosed herein pertains to a method of controlling how an element is displayed on a user interface by separately prescribing a position and a dimension of the element for when the display device is used in portrait and landscape orientations. In another aspect, the inventive concept pertains to a method of prescribing a positional limitation for an element to be displayed on a user interface and prescribing a default order for other elements to be displayed on the same user interface. In yet another aspect, the inventive concept pertains to a method of prescribing different size limitations to an element depending on whether the element is displayed on a device that is being used in landscape or portrait orientation. These methods may be implemented by a processor. The inventive concept may also pertain to a system that includes a processor and a processor-readable storage medium that stores instructions to display an element differently depending on the orientation of the display device.

Figure 1:
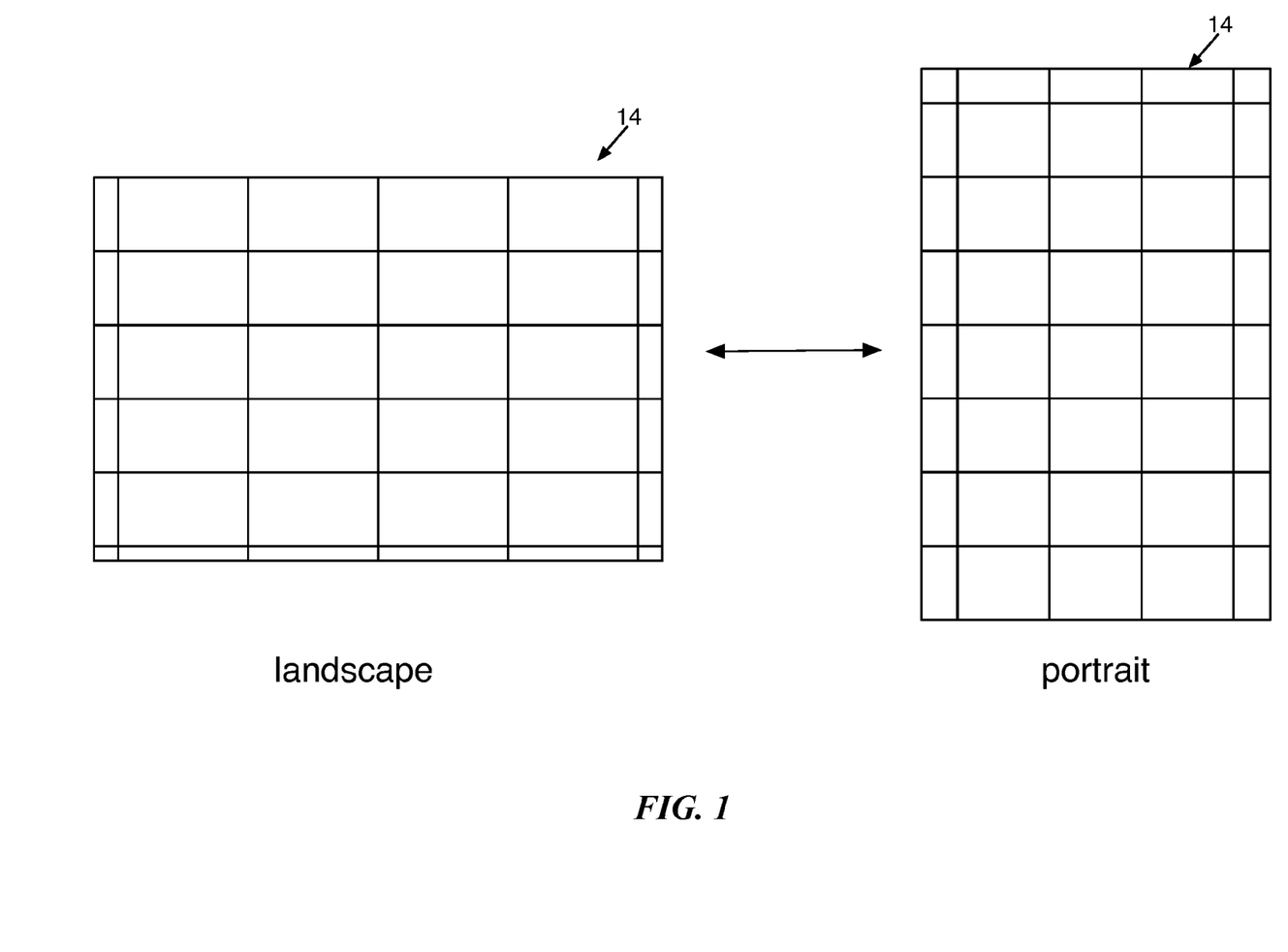
FIG. 1 illustrates a display being rotated between two orientations (landscape mode and portrait mode).

FIG. 1 depicts an illustration of a display 14 being rotated between two orientations (landscape mode and portrait mode). This figure also illustrates the division of the display into sections in each orientation. As shown, FIG. 1 represents the display 14 as a grid to illustrate the different possible layouts between the two orientations. Each rectangular division in the grid is hereby referred to as a "space" or "section" that can accommodate all or part of an element. In some embodiments, the size of a layout elements is specified in terms of a number of sections horizontally and vertically.

In the particular example shown in this figure, the sections are sized so that the display 14 has about four sections across its width and about five sections along its length in landscape orientation, with the sections having a landscape orientation. The sections in this example are sized slightly differently in portrait orientation, such that the display 14 has about three sections across its width and seven sections along its length in portrait orientation. One of ordinary skill in the art will recognize that in some embodiments the sections have the same size and shape between landscape and portrait orientations, although the size and aspect ratio is different between the two orientations in this example. In general, different embodiments may use any number of sections of any different size.

Figure 2:
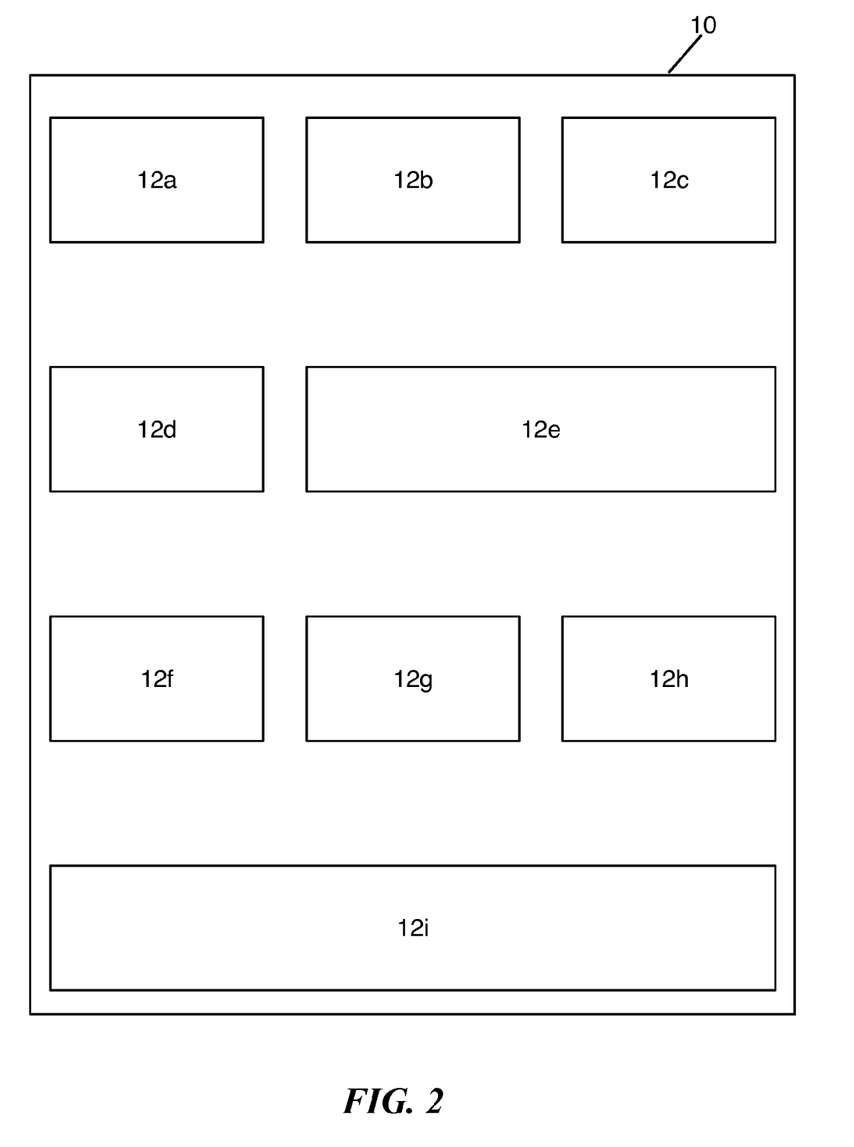
FIG. 2 depicts an electronic page layout (e.g., a user interface) displayed on a display currently operating in a portrait orientation.

FIG. 2 depicts an electronic page layout 10 (e.g., a user interface) that is displayed on the display 14, which is currently operating in a portrait orientation. The layout includes a plurality of elements 12 (e.g., tiles, icons) arranged on the electronic page 10. When the layout 10 is larger than the display device 14 (a piece of hardware the size of which remains constant), a user may scroll up and down (and/or left and right) in order to view all of the elements in the layout.

In this example, the layout 10 includes elements 12*a*-12*i*, collectively referred to as the elements 12. These elements 12 have different sizes—for instance, most of the elements 12 occupy one section horizontally, but element 12*e* occupies two sections horizontally and element 12*i* occupies three sections horizontally (an entire row). In addition, as shown, three of the rows are unoccupied in order to avoid visual cluttering, and each of the layout elements does not expand horizontally to the edge of its section, so as to leave a gap between elements next to each other in the same row.

Figure 3:
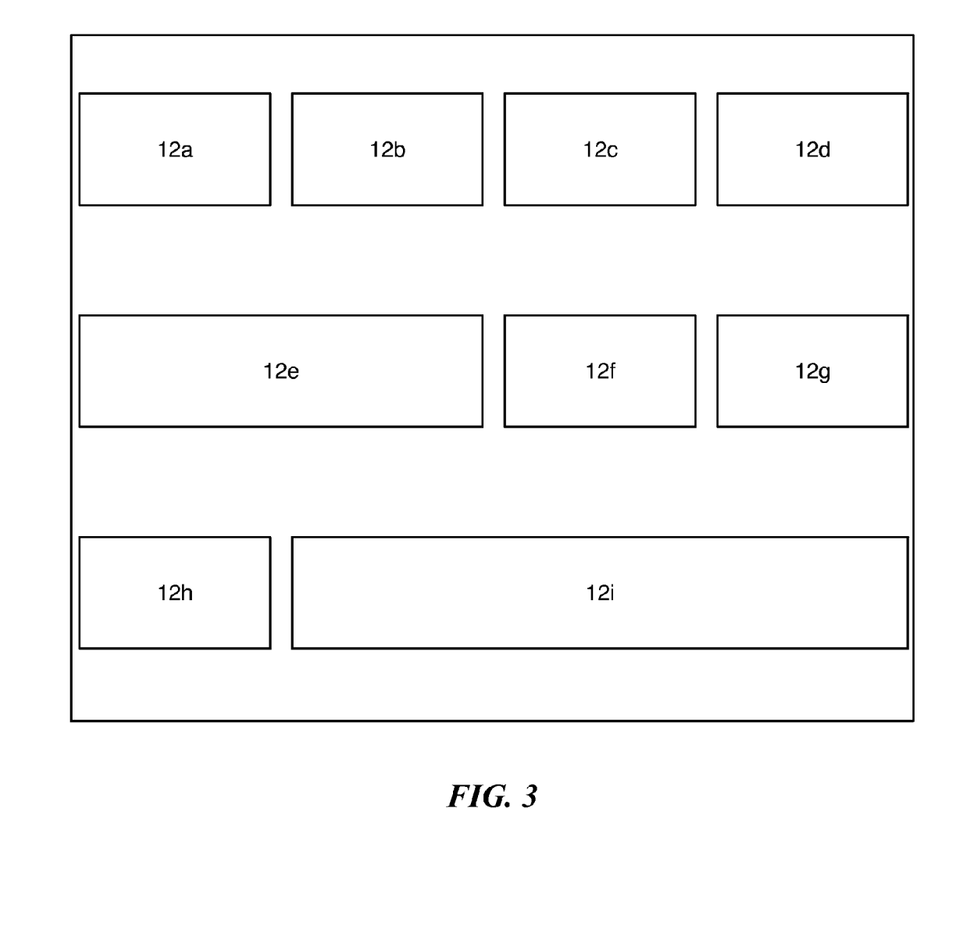
FIG. 3 depicts the electronic page layout after the display device has been rotated to a landscape orientation.

FIG. 3 depicts the electronic page layout 10 of FIG. 2 after the display device 14 has been rotated to a landscape orientation (e.g., by a user turning the device). In landscape orientation, as shown in FIG. 1, the layout may include four elements across the width of the display and five rows along its length (by leaving gaps between rows, this allows for three rows of elements). As compared to the portrait orientation of FIG. 2, although the same set of elements 12 are displayed, these elements are positioned differently relative to the edges and corners of the display device 14. For example, while element 12c is located in the top right corner of the portrait orientation layout, this element 12c is located one spot away from this corner in the landscape orientation layout (element 12d is instead in the top right corner). The order of the elements, however, remains the same between the orientations (the order being left to right and top to bottom), as does the number of sections occupied by each element in both the horizontal and vertical directions.

The automatic changes between the layout 10 in portrait and landscape orientation can be problematic for digital publishers who wish to keep certain aspects of the layout fixed irrespective of orientation. For example, in some embodiments, each of the elements 12 represents an issue of a digital electronic publication (e.g., a magazine), which the user can select in order to cause the issue to open in the display. The publisher of the magazine may want to hold certain aspects of the layout fixed, in order to showcase a special issue or the most recent issue so that it stands out among the numerous elements in the layout. Different embodiments may achieve this goal differently, by controlling the position and/or size of the element representing the issue to highlight.

For instance, the digital publisher might want to always position the element at the top right corner of the layout 10. However, based on the displays shown in FIG. 2 and FIG. 3, the publisher would not be able to determine whether the special issue should correspond to element 12c (the top right corner in portrait orientation) or 12d (the top right corner in landscape orientation). Because the publisher cannot control in which orientation a user will view the layout, the publisher cannot count on the user viewing a specific element in the top right corner.

Some embodiments, however, attach a positional limitation to a layout element, with this positional limitation then prioritized over the default ordering of the elements 12. In the examples described herein, the default ordering for the elements is "12a, 12b, 12c, . . . " from left to right then top to bottom. However, if, for example, element 12c has a positional limitation attached to be displayed at the top right corner, this element will be located at this designated position irrespective of the orientation, with the other elements arranged around it according to the default ordering. As a result, if the orientation of the display device changes, the position of the element 12c will always move to the top right corner, with the other elements filling in around it.

In addition to limitations that fix the position of one of the elements 12, the size (e.g., dimensions) of an element may also be adjusted between the two orientations in order to achieve the same objective. For example, element 12g could be designated as horizontally centered. In portrait view, the element 12g could be sized as a 1×1 element (in terms of the number of sections occupied in the horizontal direction by the number of sections occupied in the vertical direction) in portrait view. In landscape view, however, which has four sections per row, the element 12g cannot remain centered as a 1×1 element. In order to remain horizontally centered, the element 12g would need to occupy an even number of horizontal section (e.g., as a 2×1 element, a 2×2 element, etc.), and also centered using a positional limitation.

In some embodiments, the code defining the layout specifies the particular size for the element. For instance, the code might specify for the element a positional limitation (horizontally centered) and the provide specific dimensional limitations (e.g., IF portrait, THEN 1×1; IF landscape, THEN 2×1) along with instructions on how to resize the element. In the previous example regarding element 12g, whether the designer of the layout chooses a 2×1, 2×2, or other size for the element would depend on the aesthetic or communicative effect that the designer is trying to achieve. Some embodiments resize the elements by clipping or cropping the image used to represent the element, stretching the image, etc. Alternatively, the code could allow for automatic determination as to how best to resize the element 12g in order for it to remain centered in landscape orientation.

Figure 4A:
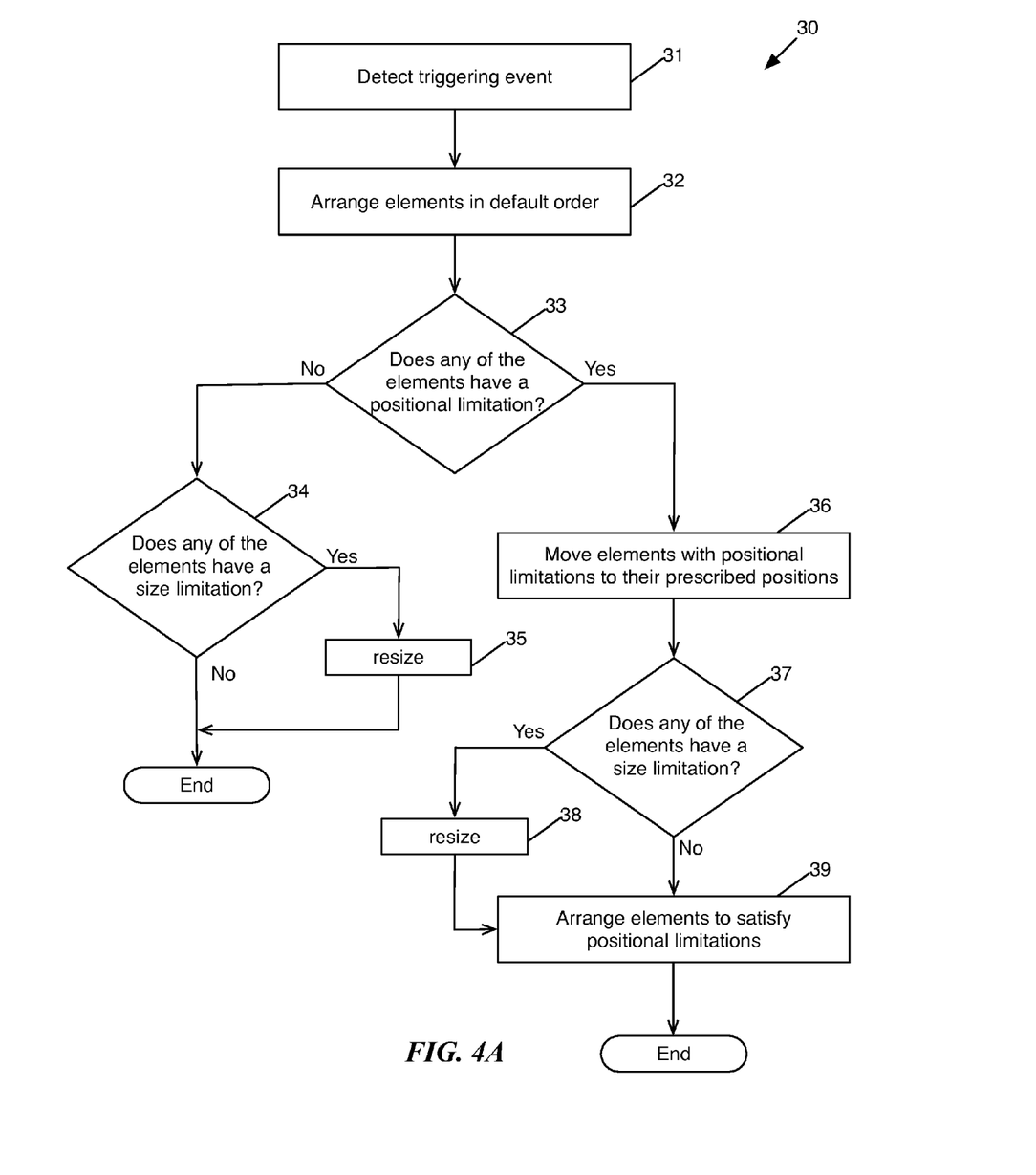
FIGS. 4A and 4B conceptually illustrates element arrangement processes of some embodiments for laying out elements, or tiles, with positional and/or size limitations.

FIG. 4A conceptually illustrates an element arrangement process 30 of some embodiments for laying out elements, or tiles, with positional and/or size limitations. This process may be performed by a back-end server or by the device on which the layout will be displayed. As shown, the process 30 begins by detecting (at 31) a triggering event. The triggering event may be an initial opening of an application that causes an initial presentation of a user interface, receipt of new content and elements associated with the content, rotation of the display device necessitating a new display of a layout in a different orientation, etc. If the process is performed by a back-end server, then the triggering even might be a request from a display device for a layout in a particular orientation. In some embodiments, detecting a triggering event entails determining the orientation of the layout needed.

The process 30 then arranges the elements in the default order. For example, FIG. 2 and FIG. 3 illustrate examples of elements arranged in default order. In some embodiments, the default order begins at the top left corner, then lays out the tiles from left to right, and top to bottom once a horizontal row is complete (e.g., as shown in FIG. 2 and FIG. 3).

The process 30 then determines (at 33) whether any of the elements have a positional limitation. As indicated, this information may be contained in the code that defines these elements. When none of the elements includes a positional limitation, the process determines (at 34) whether any of the elements have a size limitation. In some embodiments, both positional limitations and size limitations will be specified in the code that defines these elements. If no limitations are specified for a particular element, then in some embodiments the element is assumed to be placed in the default order and have a the same size in both orientations (e.g., 1×1). If none of the elements have either a size limitation or a positional limitation, then the process ends with the elements arranged in the default order.

If one or more of the elements has a size limitation for the current orientation of the layout, however, the process 30 resizes (at 35) the elements using their specified sizes and mode of resizing. Resizing the elements may necessitate moving some of the elements further along in the layout (i.e., if an element is resized from 1×1 to 2×1, then the elements after it in the order will each move by one display section.

If, as determined at 33, one or more of the elements has a positional limitation, then the process moves (at 36) these elements to their prescribed positions. For instance, if an element has a specified location in a particular corner, or along a particular edge of the display, then the process moves that element to the specified corner or edge from its default position. If the element is specified as horizontally or vertically centered, but is not in the default position, then the process moves the element to the center (e.g., of the row on which it is currently located).

The process 30 then determines (at 37) whether any of the layout elements has a size limitation (similar to operation 34) If one or more elements has a size limitation for the current orientation of the layout, the process resizes (at 38) the elements using their specified sizes and mode of resizing in order to satisfy the size limitation.

After resizing any necessary elements, the process arranges (at 39) the elements to satisfy the positional limitations. That is, although the elements with limitations have been moved and/or resized, the other elements may need to be reordered. For instance, if an element has a specified location in a particular corner, or along a particular side, etc., then the process may have to shift the element that previously occupied this location forwards or backwards. Similarly, if the element is specified as being horizontally centered but is located along the right or left edge, then the process moves the element to the center, thereby moving one of the other elements back to the edge and in a different order. In addition, the resizing of an element may result in the need to move the other elements so they are not covered by an enlarged element.

Figure 4B:
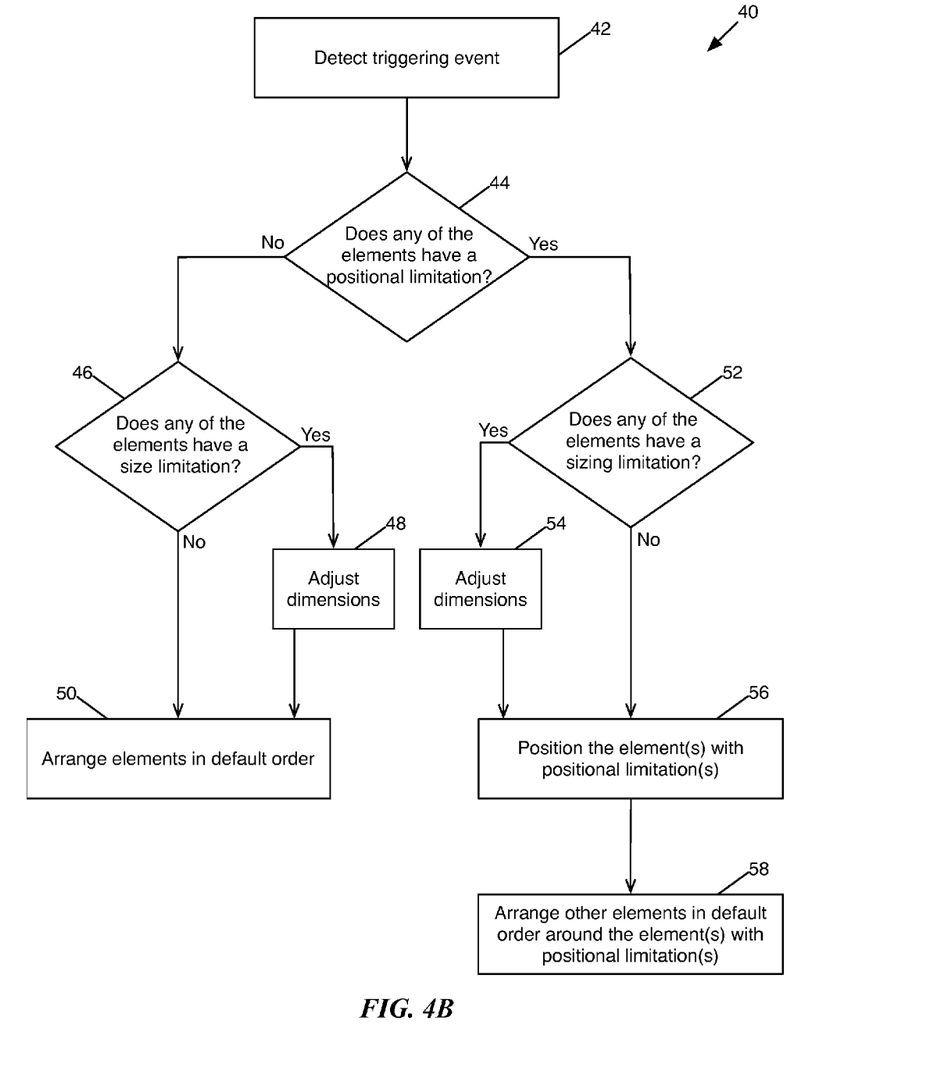

FIG. 4B conceptually illustrates a second, different element arrangement process 40 of some embodiments for laying out elements, or tiles, with positional and/or size limitations. As with the previous process 30, the process 40 may be performed by a back-end server or by the device on which the layout will be displayed. Different embodiments may use either process 30, process 40, or a similar process to achieve the objective of laying out the elements according to their order and specified limitations.

As with the process of FIG. 3, the process 40 begins by detecting (at 42) a triggering event. The triggering event may be an initial opening of an application that causes an initial presentation of a user interface, receipt of new content and elements associated with the content, rotation of the display device necessitating a new display of a layout in a different orientation, etc. If the process is performed by a back-end server, then the triggering even might be a request from a display device for a layout in a particular orientation. In some embodiments, detecting a triggering event entails determining the orientation of the layout needed.

The process 40 then determines (at 44) whether any of the elements have a positional limitation. As indicated, this information may be contained in the code that defines these elements, and may specify a particular location within the layout for the element. When none of the elements includes a positional limitation, the process determines (at 46) whether any of the elements has a size limitation. In some embodiments, both positional limitations and size limitations will be specified in the code that defines these elements. If no limitations are specified for a particular element, then in some embodiments the element is assumed to be placed in the default order and have a the same size in both orientations (e.g., 1×1).

If any size limitations are specified, the process resizes (at 48) the elements for which the resizing is specified (i.e., by adjusting the dimensions of the element). The process identifies the specified size and mode of resizing (if provided). Next, the process arranges (at 50) the elements in the default order, at their specified sizes. In some embodiments, the default order begins at the top left corner, then lays out the tiles from left to right, and top to bottom once a horizontal row is complete (e.g., as shown in FIG. 2 and FIG. 3). While the examples show a right to left and top to bottom arrangement, one of ordinary skill in the art will recognize that other default arrangements (e.g., right to left, or top to bottom then left to right, etc.). The process then ends with the layout arranged.

If, at operation 44, one or more of the elements has a positional limitation, the process next determines (at operation 52) whether any of the elements has a size limitation. In some embodiments, both positional limitations and size limitations will be specified in the code that defines these elements. If no limitations are specified for a particular element, then in some embodiments the element is assumed to be placed in the default order and have a the same size in both orientations (e.g., 1×1). If any size limitations are specified, the process resizes (at 54) the elements for which the resizing is specified (i.e., by adjusting the dimensions of the element). The process identifies the specified size and mode of resizing (if provided). In some embodiments, operations 46 and 48 and operations 52 and 54 are performed by the same code. In fact, some embodiments determine the size constraints and adjust the element sizes prior to operation 44 (i.e., the size adjustments are performed in the same way irrespective of the positional limitations).

After any resizing has been performed, the process 40 positions (at 56) the elements that have positional limitations in their specified positions. If multiple elements have positional limitations, then these elements are placed in their designated locations based in part on the default order. For instance, if two elements have a horizontal centering limitation, then the element that comes first in the order will be placed above the later element. However, if the later element has a specified location of top center, then this will supersede a previous element that only has a specified location of being centered (and will be moved down a row). The process then arranges the other elements in the default order around the fixed elements with positional limitations.

In both processes 30 and 40, the elements are generally arranged to minimize open or unoccupied spaces. In some cases, the presence of open spaces is unavoidable if the layout includes multiple large elements with positional limitations close to one another. Some embodiments consider the overall layout when assigning positional and size limitations to the elements (e.g., at the backend server), such that the interface, in its entirety, is aesthetically appealing.

In some embodiments, the elements 12 (the tiles) are the same elements in both landscape and portrait modes. That is, the provider of the layout does not provide counterpart separate tiles for the two orientation modes. The same elements are associated with positional limitations that apply to both the landscape mode and the portrait mode. The size limitations, on the other hand, may be different for the two orientation modes; however, the two orientation-specific size limitations are both associated with the same element 12.

Figure 5:
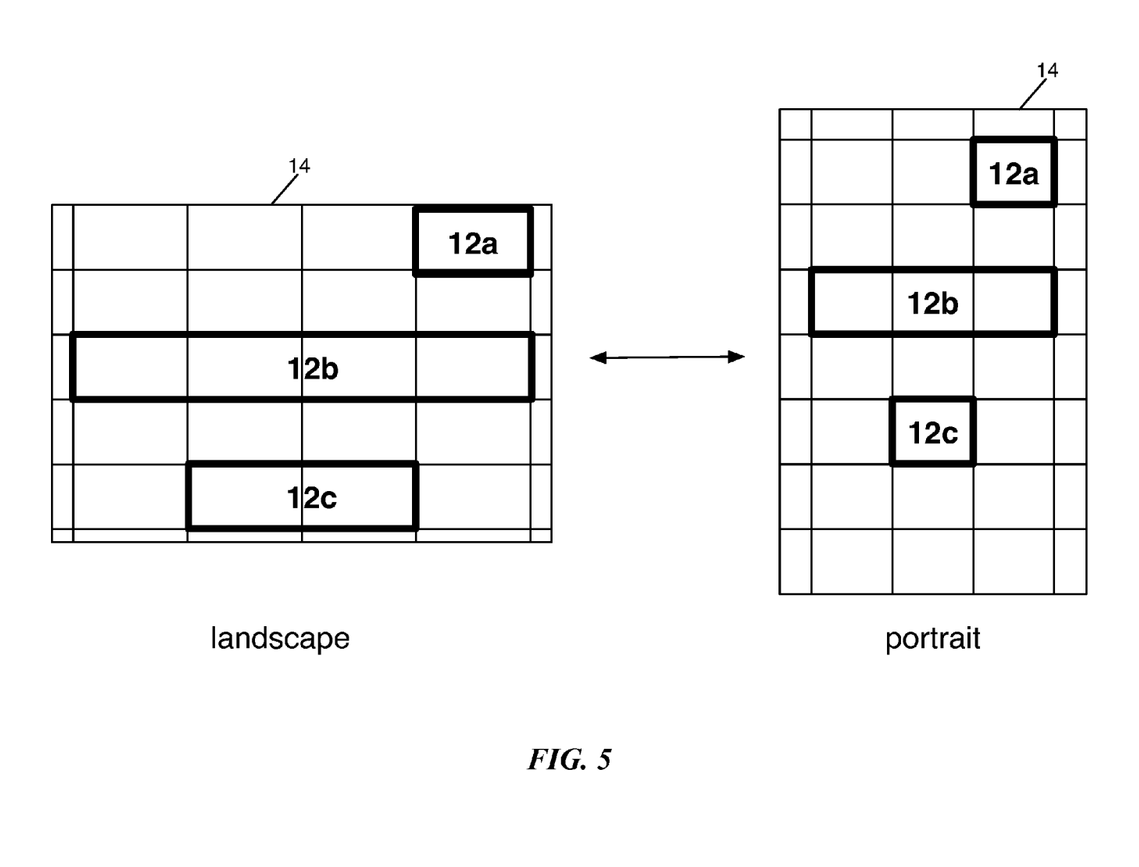
FIGS. 5-8 depict examples of the different results that the element arrangement process may produce for several elements in a layout.

FIG. 5-FIG. 8 depict examples of the different results that the element arrangement process (e.g., process 30 or 40) may produce for several elements in a layout. FIG. 5 illustrates an example of elements 12a, 12b, and 12c. In this example, the element 12a has a positional limitation to be displayed at the top right corner (i.e., in the top right section of the layout). The element 12b is a banner designed to occupy an entire row; as the width of the row is different between landscape and portrait views, there is a resizing limitation specifying a 4×1 size in landscape mode and a 3×1 size in portrait mode. Element 12c has a positional limitation to be horizontally centered. As this limitation implies a resizing limitation, the element 12c is adjusted from being a 2×1 element in the landscape orientation to a 1×1 element in the portrait orientation, and is shown at the center of a row in both cases.

Figure 6:
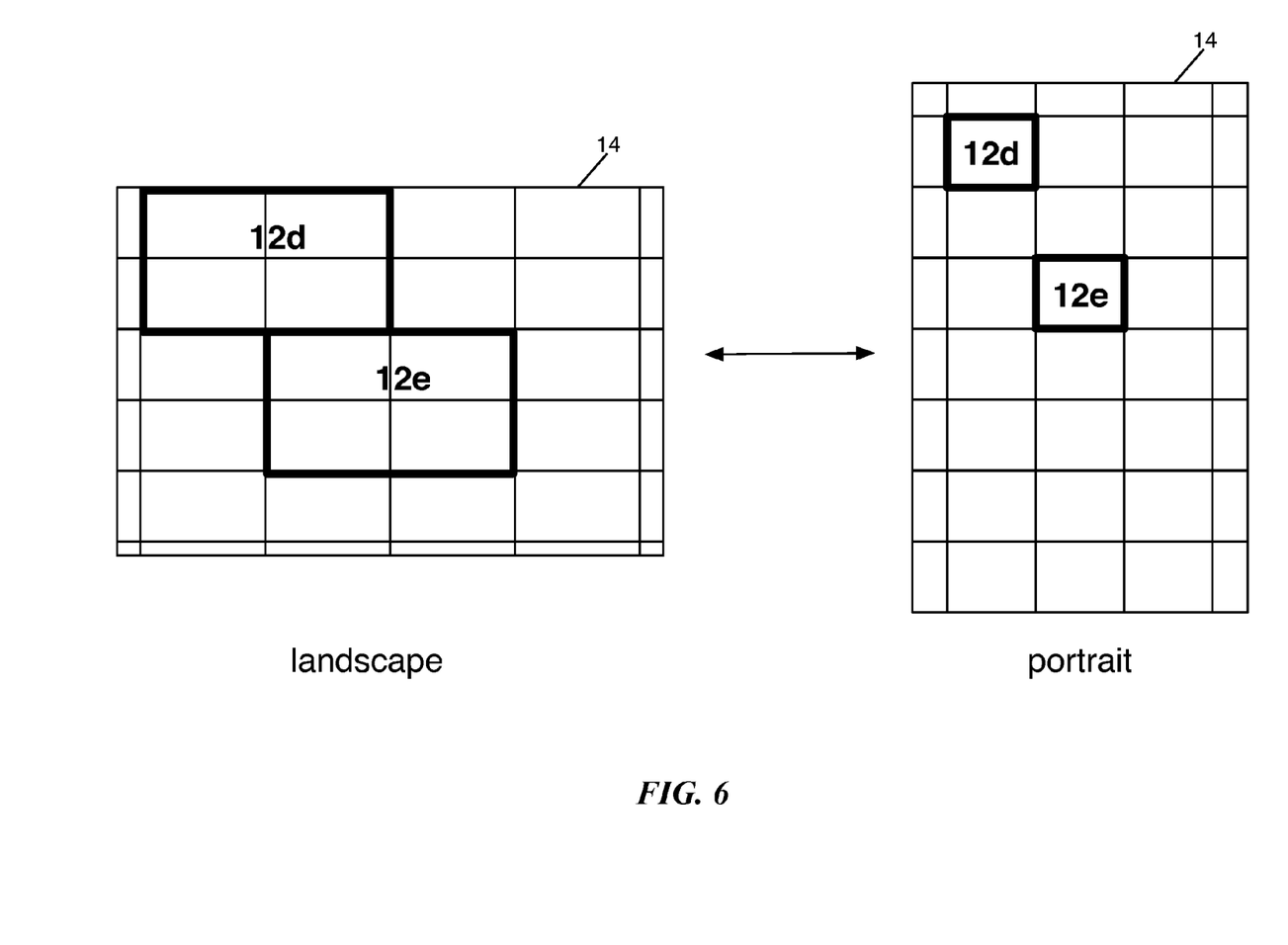

FIG. 6 illustrates an example of elements 12e and 12d. In this example, the element 12d has a positional limitation to be in the upper left corner irrespective of orientation. This element also has a size limitation, specified as a 2×2 element in landscape orientation and a 1×1 element in portrait orientation. The element 12e has a positional limitation to be horizontally centered. In some embodiments, the positional limitation also specifies that element 12e should be positioned two rows below the top of the element 12d. The element 12e also has a size limitation, specified as a 2×2 element in landscape orientation and a 1×1 element in portrait orientation.

Figure 7:
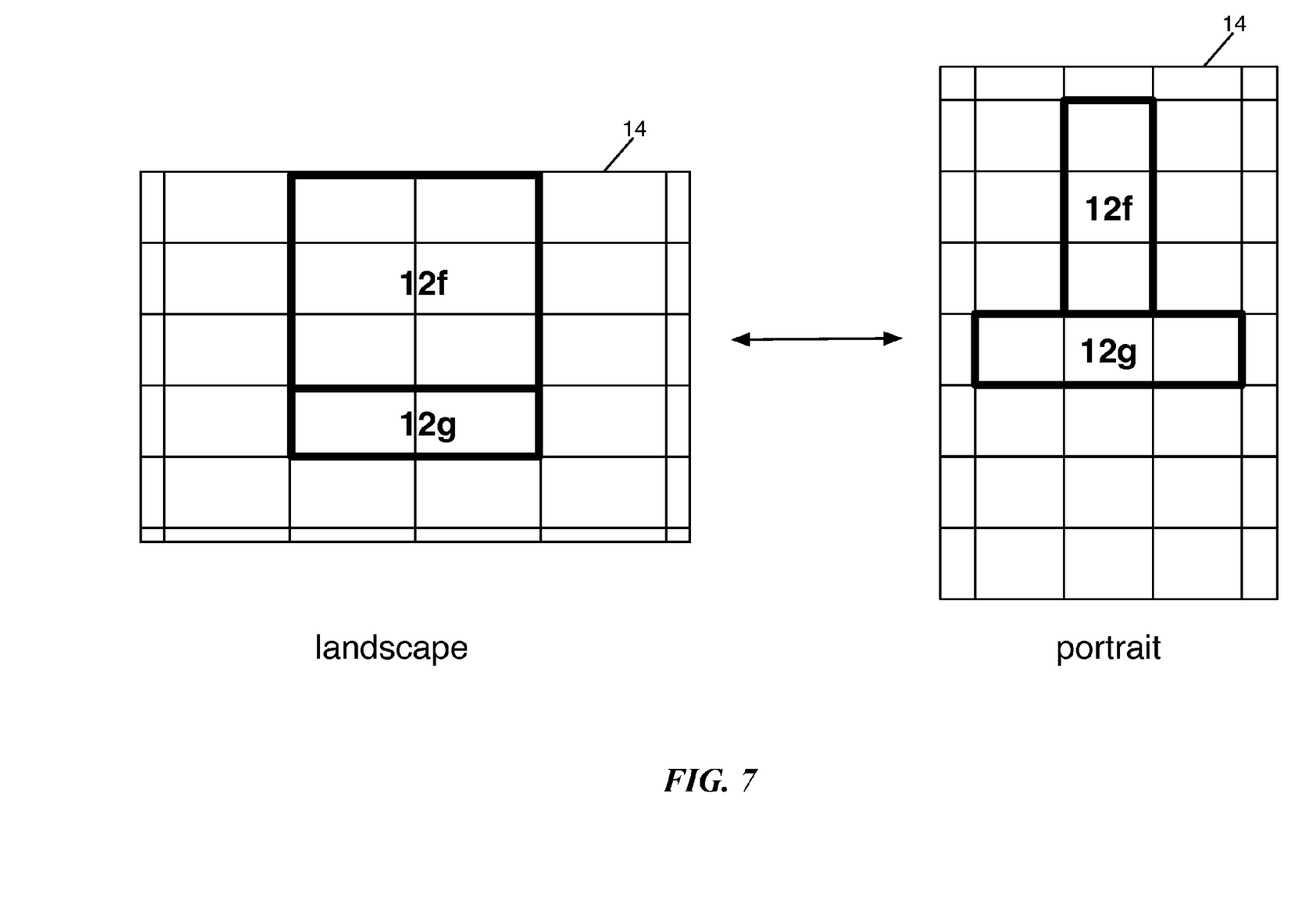

FIG. 7 illustrates an example of elements 12f and 12g. In this example, the element 12f has a positional limitation, in that it is specified as horizontally centered. This element also has a size limitation, prescribed as a 2×3 element in landscape orientation and a 1×3 element in portrait orientation. The element 12g has a size limitation, specified as 2×1 in landscape orientation and 3×1 in portrait orientation. In some embodiments, the arrangement shown in landscape orientation requires that the element 12g also have a positional limitation (horizontally centered). In other embodiments, no such requirement is necessary, as the element 12g would be horizontally centered by default because no other elements are on its row.

Figure 8:
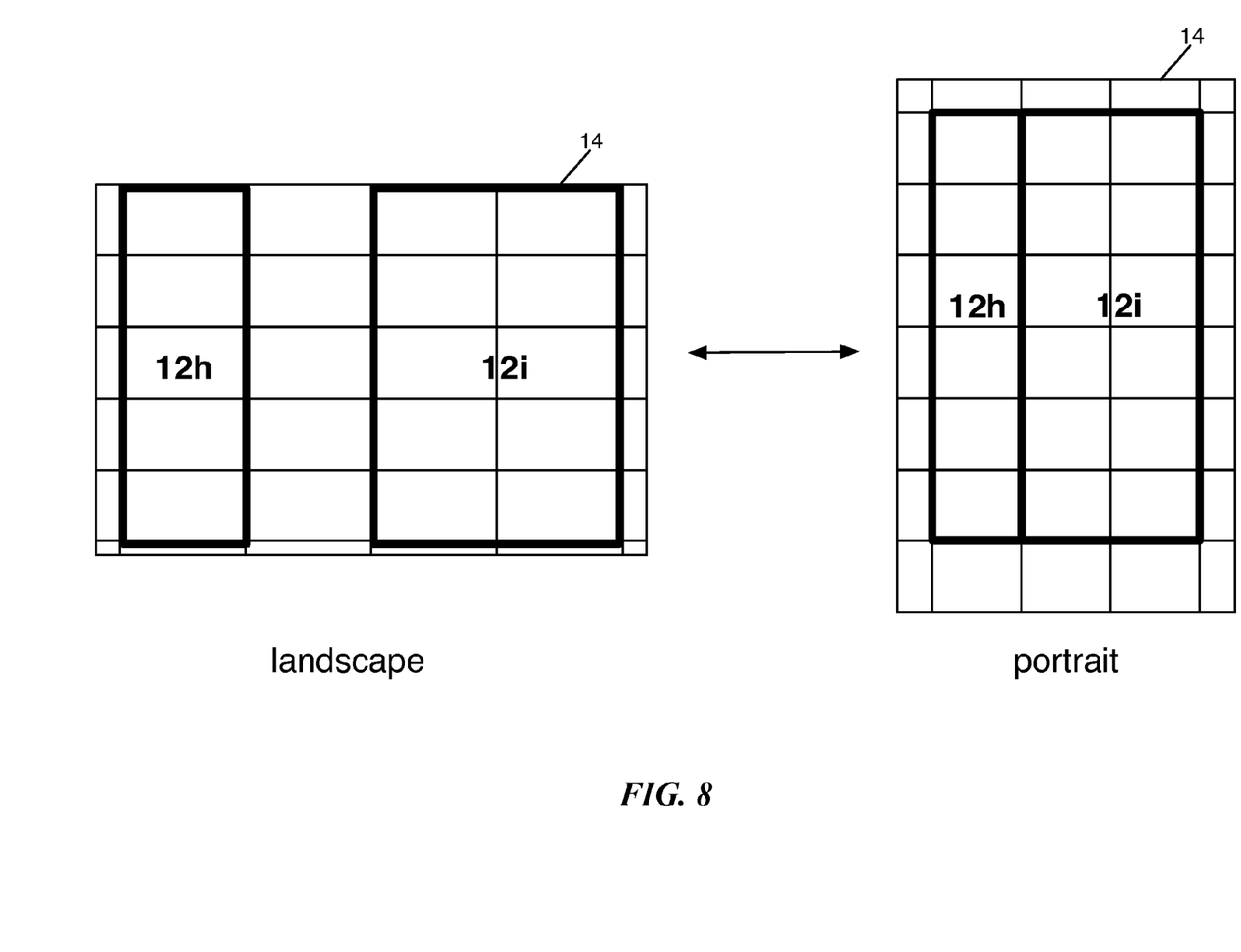

FIG. 8 illustrates an example of elements 12h and 12i. In this example, the element 12h has a positional limitation to be placed at the top left corner, and the element 12i has a positional limitation to be placed at the top right corner. The element 12h includes a size limitation specifying a 1×5 element in landscape orientation and a 1×6 element in portrait orientation, while the element 12i has a size limitation specifying a 2×5 element in landscape orientation and a 2×6 element in portrait orientation. While these FIGS. 5-8 illustrate various examples of positional and size limitations, they are not meant to be an exhaustive list of the limitations possible.

Figure 9:
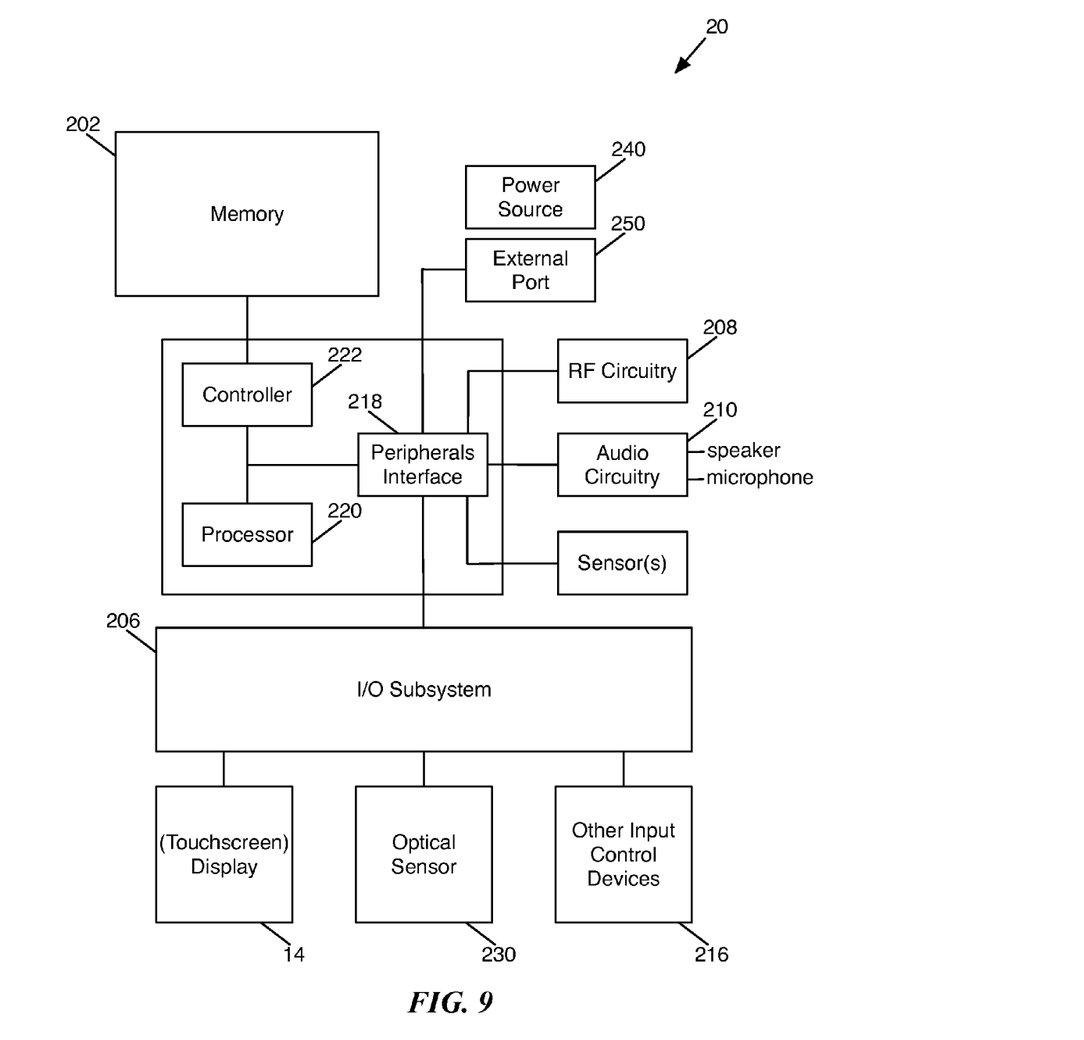
FIG. 9 is a block diagram illustrating an example display device that may be used to implement some embodiments of the invention.

FIG. 9 is a block diagram illustrating an example display device 20 that may be used to implement the inventive concept described above. As shown, the display device 20 may incorporate the display 14, which may be a touchscreen display. The display device 20 includes a memory 202 (which may include one or more computer-readable storage mediums, a memory controller 222, a processing unit 220, a peripherals interface 218, RF circuitry 208, audio circuitry 210 that control the speaker and microphone, an input/output subsystem 206, other input control devices 216, and optional optical sensor 230. These components may communicate over one or more communication buses or signal lines. The display device 20 also has a power source 240 for powering the components. The power source 240 may include a power management system, one or more power sources (e.g., battery, alternating current), a recharging system, a power failure detection circuit, a power converter or inverter, and a power status indicator, among others. An external port 250 allows the display device 20 to communicate with a network outside the physical boundaries of the device.

Various embodiments of the present invention may be implemented in or involve one or more computer systems. The computer system is not intended to suggest any limitation as to scope of use or functionality of described embodiments. The computer system includes at least one processing unit and memory. The processing unit executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present invention, the memory may store software for implementing various embodiments of the present disclosure.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computer system. In various embodiments of the present invention, the storage may store instructions for the software implementing various embodiments of the present invention. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present invention, operating system software may provide an operating environment for software's executing in the computer system, and may coordinate activities of the components of the computer system.

Various embodiments of the present disclosure may be described in the general context of computer-readable media (also referred to as machine-readable media). Computer-readable media are any available media that may be accessed within a computer system. By way of example, and not limitation, within the computer system, computer-readable media include memory, storage, communication media, and combinations thereof.

As mentioned above, in some embodiments the layout generation (e.g., process 30 or 40, or a similar process) is performed by the device on which the layout is displayed (e.g., the smart phone, tablet, etc. that displays the layout). On the other hand, in some embodiments, the layouts are generated by a back-end server and sent to a requesting display device via a communication network.

Figure 10:
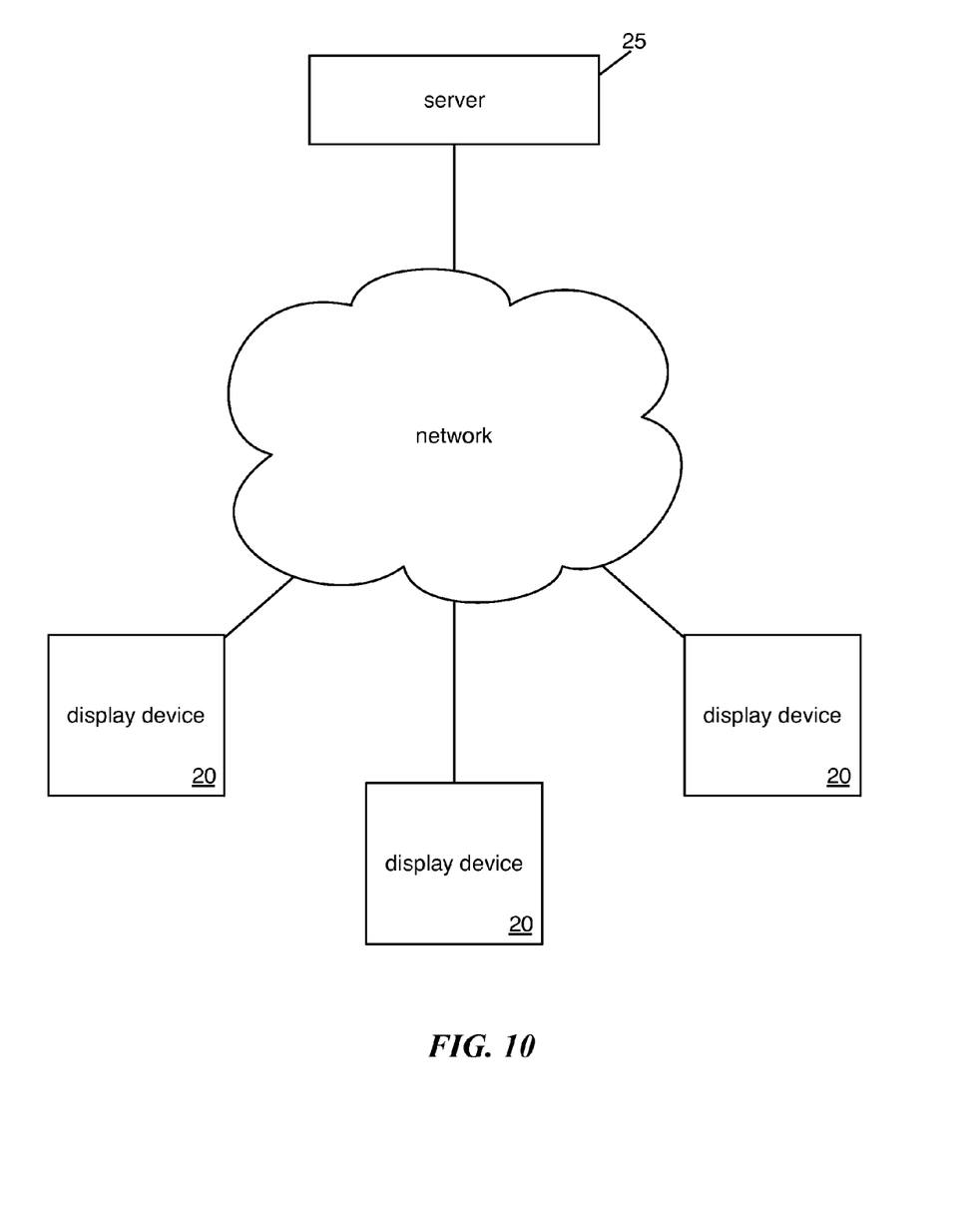
FIG. 10 illustrates several display devices connected to a backend server via a communication network.

FIG. 10 illustrates several display devices 20 connected to a backend server 25 via a communication network. The application, including the user interface, is configured, managed, and uploaded at the server 25 such that it can be accessed by the display devices 20 via the network. The display devices 20 may download or otherwise obtain the application, and may receive pushed notices periodically. In some embodiments, a display device 20 requests the application, and receives both landscape and portrait orientation layouts. Thus, the device does not need to send a request to the server 25 when the orientation changes, but can quickly display the appropriate layout.

Having described and illustrated the principles of the inventive concept with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the invention has been described with reference to numerous specific details, one of ordinary skill in the art will recognize that the invention can be embodied in other specific forms without departing from the spirit of the invention. In addition, a number of the figures (including FIGS. 4A and 4B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

I claim:

1. A method for generating a layout for display on a display device having first and second orientations, the layout comprising a plurality of layout elements, wherein the layout elements are arranged in a first order in the first orientation, the method comprising:
  determining that the display device has rotated from the first orientation to the second orientation;
  identifying size limitations and positional limitations for a set of the layout elements, wherein each layout element is defined by (i) display content, (ii) a location in an order of the layout elements, (iii) a set of size limitations that constrain its size in the first and second orientations, and (iv) a set of positional limitations that constrain its position in the layout irrespective of the orientation;
  using a size limitation for a particular layout element to define a size of a particular layout element in the second orientation to be different than a size of the particular layout element in the first orientation, wherein layout elements that do not include size limitations in their respective definition are a same size in the first and second orientations; and
  using the positional limitations for the layout elements to arrange the layout elements in a second order in the second orientation, the second order comprising at least one layout element in a different position in the order based on the positional limitation for the at least one layout element.

2. The method of claim 1, wherein the method is performed by a server, the method further comprising transmitting a generated arrangement of the layout elements in the second order to the display device in response to a request from the display device for the layout in the second orientation.

3. The method of claim 2, wherein the display device is a first display device, the method further comprising transmitting the generated arrangement of the layout elements in the second order to a second display device in response to a request from the second display device.

4. The method of claim 3, wherein the server only generates the arrangement of the layout elements once in response to requests from a plurality of display devices.

5. The method of claim 1, wherein the method is performed by the display device.

6. The method of claim 1, wherein the method is performed by an application operating on the display device.

7. The method of claim 1, wherein a particular positional limitation specifies a particular position within the layout to place a particular layout element, relative to boundaries of the layout which correspond to different locations on the display device in the first and second orientations.

8. The method of claim 1 further comprising dividing the layout into a first set of sections for the first orientation and a second set of sections for the second orientation, wherein a particular positional limitation defines a particular one of the sections to place a particular layout element in each of the first and second orientations.

9. The method of claim 1, wherein a particular positional limitation specifies a same particular corner to place a particular layout element in each of the first and second orientations.

10. The method of claim 1, wherein a particular positional limitation specifies to center a particular layout element in each of the first and second orientations.

11. The method of claim 10, wherein the particular positional limitation results in the particular layout element having different sizes in each of the first and second orientations.

12. A method for generating a layout for display on a display device having first and second orientations, the method comprising:
  receiving a layout for display on the display device, the layout comprising a plurality of layout elements arranged in a particular order, wherein each layout element is defined by (i) display content, (ii) a location in the particular order of the layout elements, and (iii) a set of display limitations that constrain at least one of a size and a display position of the layout element that overrides the location of the layout element in the particular order;
  dividing the layout into a first set of sections for the first orientation and a second set of sections for the second orientation, each section for displaying a single layout element that does not have any display limitations;
  identifying a display limitation for a particular one of the layout elements that specifies a first number of sections occupied by the particular layout element in the first orientation and a second number of sections occupied by the first layout element in the second orientation;
  generating a first display for the first orientation of the display device, wherein the particular layout element occupies the first number of sections and the plurality of layout elements are arranged in the particular order; and generating a second display for the second orientation of the display device, wherein the particular layout element occupies the second number of sections and the plurality of layout elements are arranged in a different order to accommodate the display limitation of the particular layout element.

13. The method of claim 12, wherein the first orientation is a portrait orientation and the second orientation is a landscape orientation.

14. The method of claim 12, wherein the layout comprises different numbers of sections in the first orientation and the second orientation.

15. The method of claim 12, wherein the sections of the first set of sections each have a same first size and the sections of the second set of sections each have a same second size.

16. The method of claim 12, wherein the display limitation further specifies a particular location in the layout for the particular layout element.

17. A non-transitory machine readable medium storing a program which when executed by at least one processing unit generates a layout for display on a display device having first and second orientations, the layout comprising a plurality of layout elements, wherein the layout elements are arranged in a first order in the first orientation, the program comprising sets of instructions:

determining that the display device has rotated from the first orientation to the second orientation;

identifying display limitations for a set of the layout elements, wherein each layout element is defined by (i) display content, (ii) a location in the particular order of the layout elements, and (iii) a set of display limitations that constrain at least one of a size and a display position of the layout element that overrides the location of the layout element in the particular order;

when the display limitations do not require reordering of the plurality of layout elements between the first and second orientations, displaying the plurality of layout elements in the first order in the second orientation; and when the display limitations require reordering of the plurality of layout elements between the first and second orientations, displaying the plurality of layout elements in a second order in the second orientation with the set of layout elements satisfying their respective display limitations.

18. The non-transitory machine readable medium of claim 17, wherein the set of display limitations for a particular layout element comprises a positional limitation that specifies a particular location relative to boundaries of the display device.

19. The non-transitory machine readable medium of claim 17, wherein the program is executed by at least one processing unit of the display device.

20. The non-transitory machine readable medium of claim 17, wherein the set of display limitations for a particular layout element comprises a size limitation specifying different sizes in the first and second orientations for the particular layout element.

* * * * *